(12) United States Patent
Lee et al.

(10) Patent No.: US 10,297,926 B2
(45) Date of Patent: May 21, 2019

(54) RADAR TRANSCEIVER ASSEMBLIES WITH TRANSCEIVER CHIPS ON OPPOSING SIDES OF THE SUBSTRATE

(71) Applicant: Toyota Motor Engineering & Manufacturing North America, Inc., Erlanger, KY (US)

(72) Inventors: Jae Seung Lee, Ann Arbor, MI (US); Paul Schmalenberg, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 351 days.

(21) Appl. No.: 15/173,090

(22) Filed: Jun. 3, 2016

(65) Prior Publication Data

US 2017/0352958 A1     Dec. 7, 2017

(51) Int. Cl.
*H01Q 21/08* (2006.01)
*G01S 7/03* (2006.01)
*H01Q 1/22* (2006.01)
*H01Q 1/24* (2006.01)

(52) U.S. Cl.
CPC ............ *H01Q 21/08* (2013.01); *G01S 7/032* (2013.01); *H01Q 1/2283* (2013.01); *H01Q 1/247* (2013.01)

(58) Field of Classification Search
CPC ...... G01S 7/032; H01Q 1/2283; H01Q 1/247; H01Q 21/08
USPC ......................................................... 342/175
See application file for complete search history.

(56) References Cited

U.S. PATENT DOCUMENTS

| 7,218,282 | B2 | 5/2007 | Humpfer et al. |
| 7,499,736 | B2 | 3/2009 | Tran |
| 8,004,468 | B2 | 8/2011 | Al-Mahdawi |
| 8,089,409 | B2 | 1/2012 | Shibata |
| 2015/0236425 | A1 | 8/2015 | Sudo et al. |
| 2017/0012363 | A1* | 1/2017 | Zou ........................ H01Q 21/00 |

* cited by examiner

*Primary Examiner* — Timothy A Brainard
(74) *Attorney, Agent, or Firm* — Dinsmore & Shohl LLP

(57) ABSTRACT

The radar transceiver assembly configured to reduce ghost lobes and narrow the receive beams so as to provide a better image resolution relative to current radar transceiver assemblies is provided. The radar transceiver assembly includes a first transceiver chip and a second transceiver chip mounted on opposite sides of the substrate. The accordingly, space on the first support surface may be utilized for antennas. The first array of transmit antennas and first array of receive antennas is interleaved with the second array of transmit antennas and the second array of receive antennas. The second array of transmit antennas and the second array of receive antennas are electrically coupled to the second transceiver chip via a coupling structure.

20 Claims, 7 Drawing Sheets

RADAR TRANSCEIVER ASSEMBLIES WITH TRANSCEIVER CHIPS ON OPPOSING SIDES OF THE SUBSTRATE

TECHNICAL FIELD

Embodiments described herein generally relate to radar transceiver assemblies and, more specifically, to radar transceivers assemblies configured to reduce ghost lobes.

BACKGROUND

Radar transceiver assemblies include at least a pair of transceivers mounted on the same surface of a substrate. The radar transceiver assemblies further include a plurality of transmit and receive antennas electrically coupled to the radar transceivers. The radar transceivers are disposed on the same surface of the substrate. The receive antennas are spaced apart from each other.

With reference now to FIG. 1, an embodiment of a currently known radar transceiver assembly 100 is provided. The radar transceiver assembly 100 includes a first transceiver chip 102 and a second transceiver chip 104. The first and second transceiver chips 102, 104 are mounted on the top surface of a substrate 106. Each of the first and second transceiver chips 102, 104 illustratively include an array of transmit antennas 108 and an array of receive antennas 110. In this instance, each array includes four transmit antennas 108a and four receive antennas 110a respectively.

Each antenna array 108, 110 respectively transmits and receives a radar signal. Each antenna array 108, 110 has a respective center signal as indicated by "TC" (Transmit Center) and "RC" (Receive Center). It is known that the distance between the center of respective receive antenna arrays 110a affects the ghost lobes and the beam width. As used herein, "ghost lobe" refers to the signature pattern disposed on each side of a center signal of respective receive and transmit signal as generally shown in FIGS. 8 and 9. In particular, the greater the distance, the greater the signature of ghost lobes and the broader the signal of the receive beam.

FIG. 2 is a cross-sectional view of the radar transceiver assembly 100 shown in FIG. 1 and illustrates the center signal of the respective array of receive antennas. It is known that the larger the distance between the center signals RC1 and RC2, the larger the signature of ghost lobes. It is further appreciated that the size of the ghost lobe and the beam affects the quality of the receive signal. In particular, the wider the receive beam and the larger the ghost lobes, the poorer the quality of the receive signal.

FIG. 1 also shows radar transceiver assemblies 100 are currently assembled with both the transceiver chips 102, 104 and the receive and transmit array antennas 110, 108 mounted on the same side of the substrate 106. Such an arrangement may limit the capabilities of the radar transceiver as packaging space may limit the number of transmit and receive antennas that may fit onto the substrate.

Accordingly, it is desirable to have a radar transceiver assembly wherein both sides of the substrate may be used to accommodate receive and transmit antennas so as to maximize packaging space. It further remains desirable to have a radar transceiver assembly wherein the occurrence of ghost lobes is minimized and the width of the receive beam is narrowed relative to current radar assembly antennas.

SUMMARY

Radar transceiver assemblies configured to reduce the signature of the ghosts lobes and generate a narrow receive beam relative to current radar transceiver assemblies are described. One embodiment of a radar transceiver assembly includes a substrate having a first support surface opposite a second support surface. The radar transceiver assembly includes a first transceiver chip and a second transceiver chip. The first transceiver chip is mounted on the first support surface of the substrate. The second transceiver chip is mounted to the second support surface.

The radar transceiver assembly further includes a first array of transmit antennas, a first array of receive antennas, a second array of transmit antennas and a second array of receive antennas. The first array of transmit antennas, the first array of receive antennas, the second array of transmit antennas and the second array of receive antennas are mounted on the first support surface.

Each of the first array of receive and transmits antenna include a plurality of respective receive and transmit antennas. Likewise, each of the second array of receive and transmit antennas include a respective receive and transmit antennas. The first array of transmit antennas and the first array of receive antennas are electrically coupled to the first transceiver chip via a respective conductive trace. The conductive trace may be printed onto the substrate.

The second array of transmit antennas and the second array of receive antennas are conductively coupled to the second transceiver chip located on the second support surface. The first array of receive antennas are interleaved with the second array of receive antennas. In one embodiment, the receive antennas in the first array of receive antennas are centered between respective receive antennas in the second array of receive antennas.

In another embodiment, a radar transceiver assembly is configured such that the first array of transmit antennas and the second array of transmit antennas are interleaved. It should be appreciated that by interleaving the first and second array of transmit antennas allows for the radar transceiver assembly to maximize the space of the substrate. It should be further appreciated that the greater number of transmit antennas increase the resolution of the signal.

In another embodiment of the radar transceiver assembly of claim, the coupling structure extends from the first support surface of the second support surface. The coupling structure may be a waveguide disposed between a pair of via holes extending between the first support surface and the second support surface. The waveguide may be made of a dielectric material or conductive material.

Accordingly, the radar transceiver assembly may accommodate more receive and transmit antennas relative to radar transceiver assemblies with the receive antennas and transmit antennas disposed on the same surface of the substrate so as to provide a better resolution relative to radar transceiver assemblies wherein the array of receive antennas are disposed in a side-by-side relationship. Further, the interleaved first and second array of receive antennas position the center signal of respective first array of receive antennas and the second array of receive antennas closer together relative to radar transceiver assemblies wherein the array of receive antennas are disposed in a side-by-side relationship so as to reduce the signal of ghost lobes.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 4 is a cross-sectional view of the radar transceiver assembly shown in FIG. 3a;

DETAILED DESCRIPTION

Embodiments disclosed herein include radar transceiver assemblies configured to reduce the signature of the ghosts lobes and generate a narrow receive beam relative to current radar transceiver assemblies. The radar transceiver assemblies may accommodate more receive and transmit antennas relative to radar transceiver assemblies with the receive antennas and transmit antennas disposed on the same surface of the substrate so as to provide a better resolution. Further, the first and second array of receive antennas are interleaved so as to position the center of respective first array of receive antennas and the second array of receive antennas closer together relative to radar transceiver assemblies wherein the array of receive antennas are disposed in a side-by-side relationship. It should be appreciated that shortening the distance between the center of the arrays of receive antennas reduces the signal of ghost lobes which facilitates signal processing of the center signal so as to produce better image quality.

The radar transceiver assembly includes a substrate having a first support surface opposite a second support surface. The radar transceiver assembly includes a first transceiver chip and a second transceiver chip. The first transceiver chip is mounted on the first support surface of the substrate. The second transceiver chip is mounted to the second support surface. Accordingly, space on the both surfaces may be utilized for antennas which may help provide better image resolution.

The radar transceiver assembly further includes a first array of transmit antennas, a first array of receive antennas, a second array of transmit antennas and a second array of receive antennas. The first array of transmit antennas, the first array of receive antennas, the second array of transmit antennas and the second array of receive antennas are mounted on the first support surface.

Each of the first array of receive and transmits antenna include a plurality of respective receive and transmit antennas. Likewise, each of the second array of receive and transmit antennas include a respective receive and transmit antennas. The first array of transmit antennas and the first array of receive antennas are electrically coupled to the first transceiver chip via a respective conductive trace. The conductive trace may be printed onto the substrate.

The second array of transmit antennas and the second array of receive antennas are conductively coupled to the second transceiver chip located on the second support surface. The first array of receive antennas are interleaved with the second array of receive antennas. In one embodiment, the receive antennas in the first array of receive antennas are centered between respective receive antennas in the second array of receive antennas.

Figure 3A:
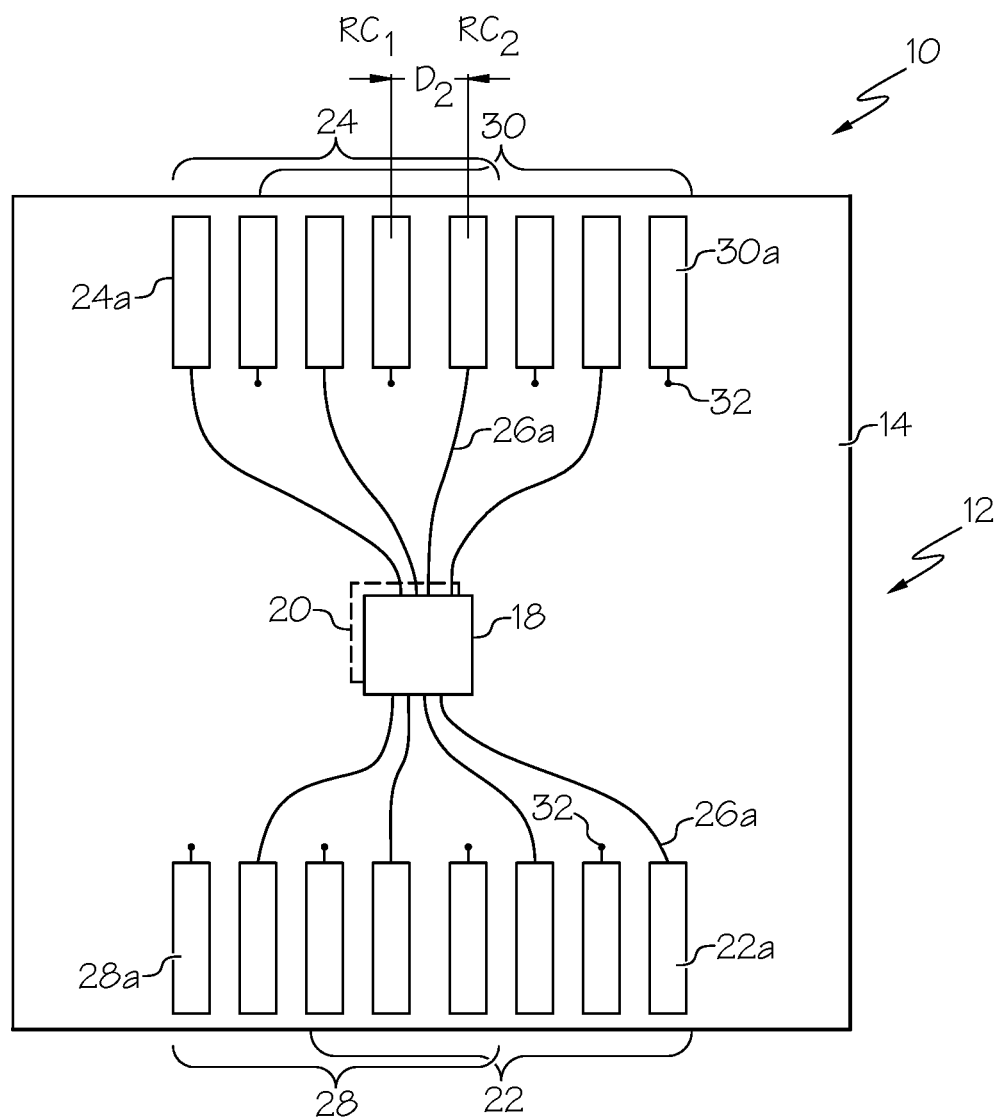
FIG. 3a is a top down view of a first support surface of a radar transceiver assembly, according to embodiments described herein.

Referring now to the drawings, FIG. 3a is a top down view of an embodiment of a radar transceiver assembly 10. The radar transceiver assembly 10 includes a first substrate 12. The first substrate 12 includes a first support surface 14 opposite a second support surface 16 (shown in FIG. 4). The first substrate 12 may be a non-conductive material illustratively including fiberglass commonly referenced as FR4. The first substrate 12 may have a thickness configured to support electronic components. In one embodiment, the first substrate 12 is 1.6 mm thick.

The radar transceiver assembly 10 includes a first transceiver chip 18 mounted on the first support surface 14 of the first substrate 12. A second transceiver chip 20 is mounted on the second support surface 16 of the first substrate 12 and may be directly opposite the first transceiver chip 18. The first and second transceiver chips 18, 20 are configured to modulate and steer the radio waves transmitted and received by the radar transceiver assembly 10.

The radar transceiver assembly 10 further includes a first array of transmit antennas 22 and a first array of receive antennas 24 mounted on the first support surface 14. Each of the first array of transmit antennas 22 and the first array of receive antennas 24 is electrically coupled to the first transceiver chip 18 via a respective conductive trace 26a. The conductive trace 26a may be a conductive material printed onto the first substrate 12. Any such material currently known and used may be adaptable for use herein, illustratively including brass, copper, silver or aluminum.

The radar transceiver assembly 10 further includes a second array of transmit antennas 28 and a second array of receive antennas 30. The second array of transmit antennas 28 and the second array of receive antennas 30 are also mounted on the first support surface 14. Each of the second array of transmit antennas 28 and the second array of receive antennas 30 is conductively coupled to the second transceiver chip 20.

FIG. 3a shows the first array of receive antennas 24 are interleaved with the second array of receive antennas 30. As used herein, the term "interleaved" refers to one antenna from one array disposed between a pair of antennas in another array. For example, the first array of receive antennas 24 have a plurality of first receive antennas 24a disposed between a pair of adjacent second receive antennas 30a of the second array of receive antennas 30.

FIG. 3a also shows the first array of transmit antennas 22 interleaved with the second array of transmit antennas 28. The first array of transmit antennas 22 include a plurality of first transmit antennas 22a. The second array of transmit antennas 28 include a plurality of second transmit antennas 28a. The first transmit antennas 22a are disposed between a respective pair of adjacent second transmit antennas 28a.

Figure 3B:
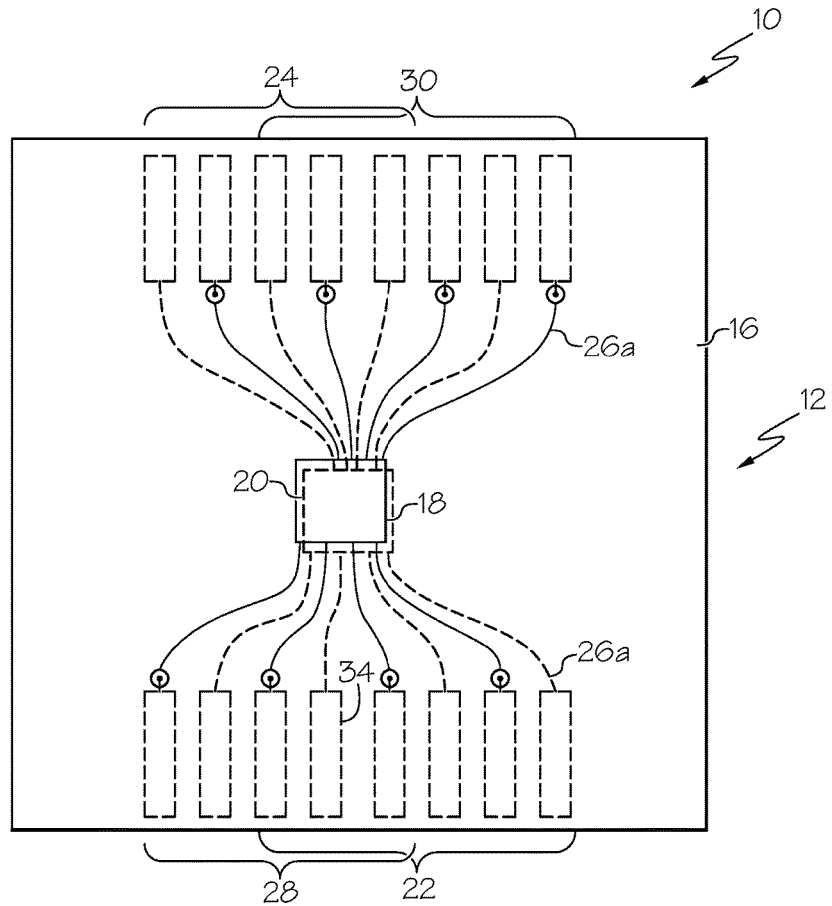
FIG. 3b is a top down view of a second support surface of a radar transceiver assembly, according to embodiments described herein.

FIG. 3b is a top down view of the second support surface 16 of the radar transceiver assembly 10. A plurality of conductive traces 26b connect the second array of receive antennas 30 and the second array of transmit antennas 28 to the second transceiver chip 20. In particular, FIG. 3b shows an embodiment wherein conductive traces 26b are electrically coupled to a coupling structure 32. The coupling structure 32 is electrically coupled to a respective second transmit antenna 28a and second receive antenna 30a.

FIG. 3b also provides, in dashed view, the first and second array of transmit antennas 22, 28. Accordingly, all of the receive antennas and transmit antennas 24a, 30a, 22a and 28a are mounted on the first support surface 14 of the first substrate 12 so as to be positioned to freely transmit and receive signals. However, the second transceiver chip 20, which is mounted to the second support surface 16, is free to steer the receive and transmit signals to and from respective second arrays of transmit and receive antennas 28, 30.

Figure 4:
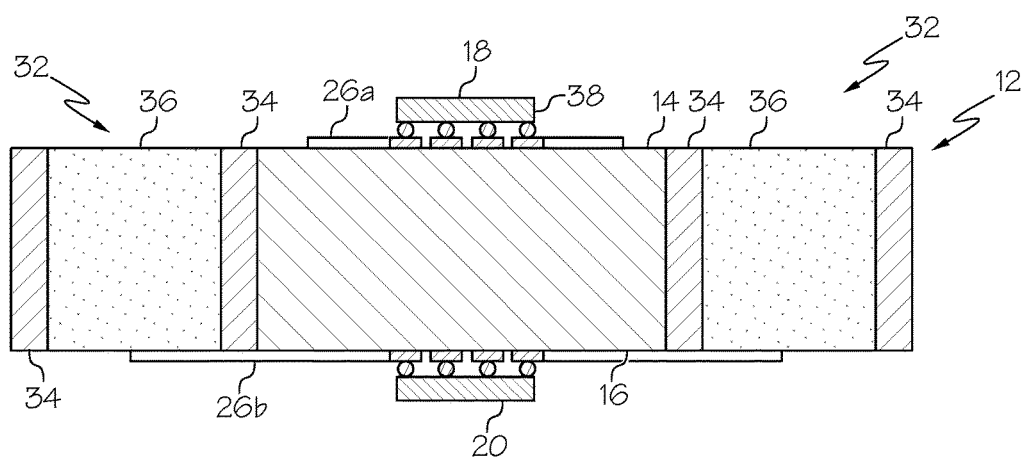

FIG. 4 is a cross-sectional view of the radar transceiver assembly 10 shown in FIG. 3a. The first transceiver chip 18 is illustratively shown directly opposite the second transceiver chip 20. Conductive traces 26 are shown directly coupling first array of transmit antennas 22 and the first array of receive antennas 24 to the first radar transceiver chip 18.

The coupling structure 32 is configured to conductively couple each of the second array of transmit antennas 28 and the second array of receive antennas 30 to the second transceiver chip 20. Conductive traces 26a, 26b are also shown coupling the second transceiver chip 20 to the coupling structure 32. In one embodiment the coupling structure 32 includes a pair of via-holes 34 extending from the first support surface 14 to the second support surface 16. A waveguide 36 is disposed between the pair of via-holes 34. The waveguide 36 may be formed of a conductive material to include brass, copper, silver or aluminum. In one embodiment of the waveguide 36, the waveguide 36 is formed of a dielectric material.

Figure 5:
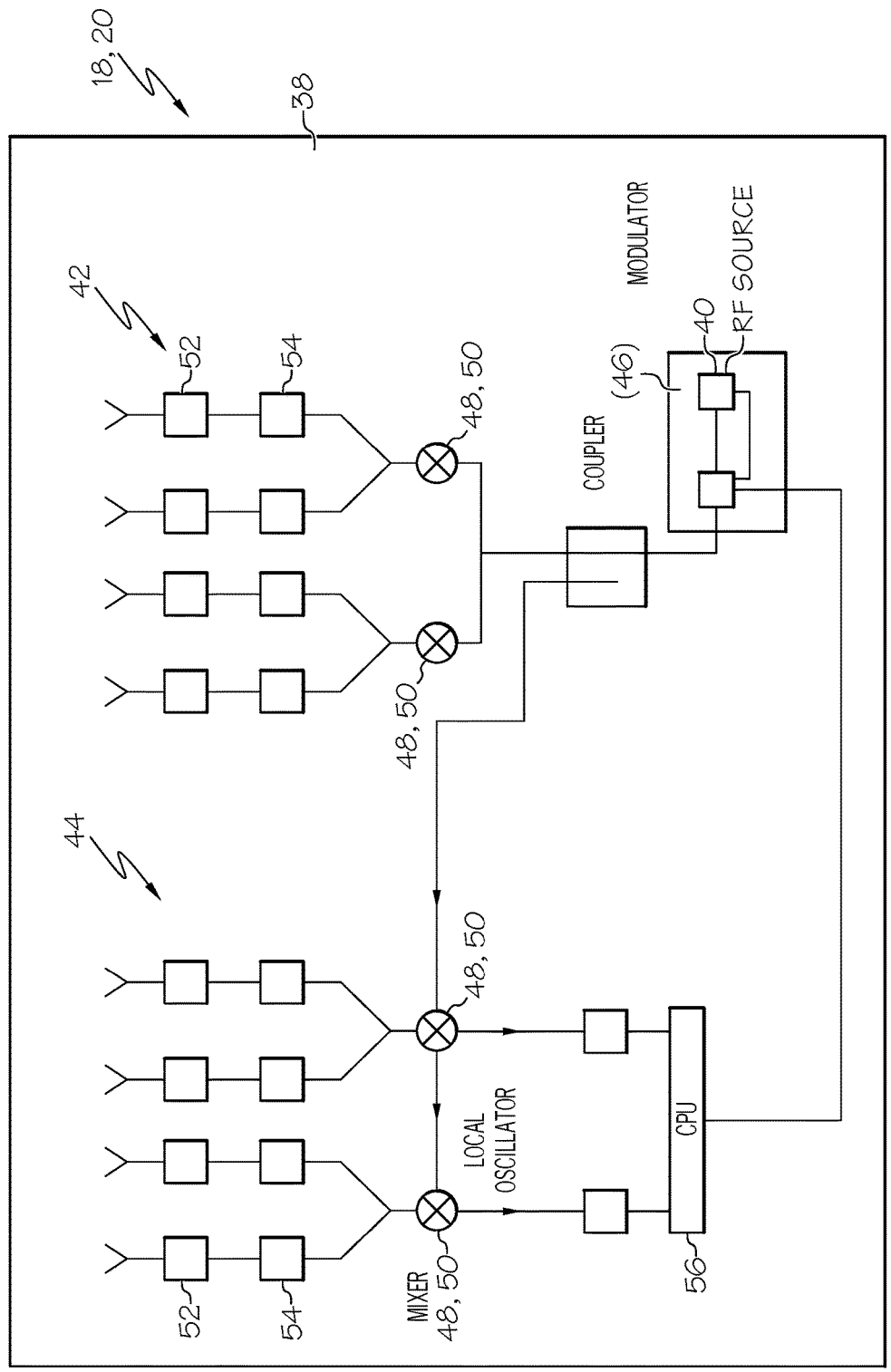
FIG. 5 is a schematic view of an illustrative embodiment of a transceiver chip according to embodiments described herein.

FIG. 5 is schematic diagram showing an illustrative embodiment of a radar transceiver chip 18, 20. The radar transceiver chip 18, 20 shown in FIG. 5 is illustrative of either the first transceiver chip 18 or the second transceiver chip 20. The radar transceiver chip 18, 20 is mounted on a second substrate 38, to include a printed substrate. The radar transceiver chip 18, 20 may include a radio wave source 40 as illustratively shown in FIG. 5 or may include a feed line to receive a radio wave source 40 externally. The radar transceiver chip 18, 20 includes a transmit unit 42 and a receive unit 44.

The transmit unit 42 includes a modulator 46 configured to convert the radio signal generated by the radio wave source 40 into an electrical signal for processing. The electrical signal is transmitted to a mixer 48. The mixer 48 may include a local oscillator 50. The mixer 48 and the local oscillator 50 is configured to change the frequency of the electric signal so as to facilitate signal processing. The electric signal is split and transmitted to an amplifier 52 and a phase shifter 54. The mixer 48, local oscillator 50, amplifier 52 and phase shifter 54 are controlled by a control unit 56 so as to steer the transmit signal. The transmit signal is then transmitted from the first and second transmit antennas 22a, 28a.

The receive unit 44 is configured to receive the receive beam. The receive unit 44 is coupled to each first and second receive antenna 24a, 30a in the respective first and second array of receive antennas 24, 30. The receive antennas 24a, 30a are electrically steered by the phased shifters 54 and amplified by an amplifier 52. The receive beams are processed by an mixer 48. The mixer may include a local oscillator 50 configured to change the frequency of the receive beams so as to facilitate signal processing. The receive beam is processed in conjunction with the transmit signals so as to process an image.

With reference again to FIG. 3a, the first array of transmit antennas 22 include a predetermined number of first transmit antennas 22a and the first array of receive antennas 24 include a predetermined number of first receive antennas 24a. The number of first transmit antennas 22a are equal to the number of first receive antennas 24a. For illustrative purposes, the first array of transmit antennas 22 is shown as having four (4) first transmit antennas 22a and the first array of receive antennas 24 is shown as having four (4) first receive antennas 24a. However, it should be appreciated that the embodiments shown in FIGS. 3a and 3b are provided for illustrative purposes only and that the first array of transmit antennas 22 and the first array of receive antennas 24 may include more transmit antennas and receive antennas than what is shown, but includes at least two first receive antennas 22a and second receive antennas 24a.

Likewise, the second array of transmit antennas 28 include a predetermined number of second transmit antennas 28a and the second array of receive antennas 30 include a predetermined number of second receive antennas 30a. The number of second transmit antennas 28a is equal to the number of second receive antennas 30a. For illustrative purposes, the second array of transmit antennas 28 is shown as having four (4) second transmit antennas 28a and the second array of receive antennas 30 is shown as having four (4) second receive antennas 30a. However, it should be appreciated that the embodiments shown in FIGS. 3a and 3b are provided for illustrative purposes only and that the second array of transmit antennas 28 and receive antennas 30 may include more than what is shown, but at least two second transmit antennas 28a and second receive antennas 30a.

In one embodiment of the radar transceiver assembly 10, the first and second receive antennas 24a, 30a and the first and second transmit antennas 22a, 28a in respective first and second array of receive antennas 24, 30 and transmit antennas 22, 28 are equally spaced apart from each other. As described above, the first array of receive antennas 24 is interleaved with the second array of receive antennas 30. Accordingly, the first receive antennas 24a in the first array of receive antennas 24 is centered between a respective pair of second receive antennas 30a in the second array of receive antennas 30.

Each of the receive antennas 24a, 30a may be spaced apart from each other 1 to 2 wavelengths. As used herein, the wavelength refers to the wave length of the radio signal generated by the radio wave source 40. For instance, a radar transceiver assembly 10 for use in automotive applications may have a radio signal between 10 to 60 GHz, such a radio signal may have a wavelength between 3 mm to 30 mm.

Figure 6:
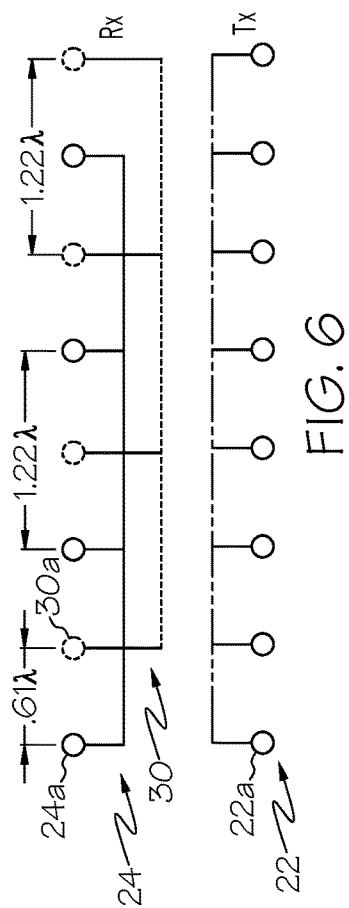
FIG. 6 is a schematic view of an array of interleaved receive antennas according to embodiments described herein.

With reference now to FIG. 6, an embodiment of a first array of receive antennas 24 and an array of second receive antennas 30 adaptable for use in automotive applications is provided. The first receive antennas 24a are spaced 1.22 wavelengths away from each other. The second receive antennas 30a are also spaced 1.22 wavelengths away from each other. FIG. 5 shows the first array of receive antennas 24 interleaved with the second array of receive antennas 30. The first receive antennas 24a are centered between a pair of respective second receive antennas 30a, so as to be 0.61 wavelengths between respective second receive antennas 30a. Since the first array of receive antennas 24 have the same number of receive antennas as the second array of receive antennas 30, an end first receive antenna 24a is disposed axially from an end second receive antenna 30. The center signal of the first array of receive antennas 24 is indicated RC1 and the center signal of the second array of receive antennas 30 is indicated by RC2.

An operation of the radar transceiver assembly 10 is now provided with reference to FIG. 3a. FIG. 3a shows the first array of transmit antennas 22, first array of receive antennas 24, second array of transmit antenna, second array of receive antennas 30 and the first transceiver chip 18 all mounted on the first support surface 14 of the substrate 12. The first array of receive antennas 24 and the second array of receive antennas 30 are interleaved with each other. The second transceiver chip 20 is mounted on the second support surface 14 and may be directly opposite the first transceiver chip 18.

As the first array of receive antennas 24 are actuated, a center signal is generated. The center signal of the first array of receive antenna is indicated by "RC1". Likewise, as the second array of receive antennas 30 are actuated a center signal is also generated. The center signal of the second array of receive antenna is indicated by "RC2". The center signal is disposed equidistant from the antennas disposed on the antennas at the ends of the respective array.

Figure 1:
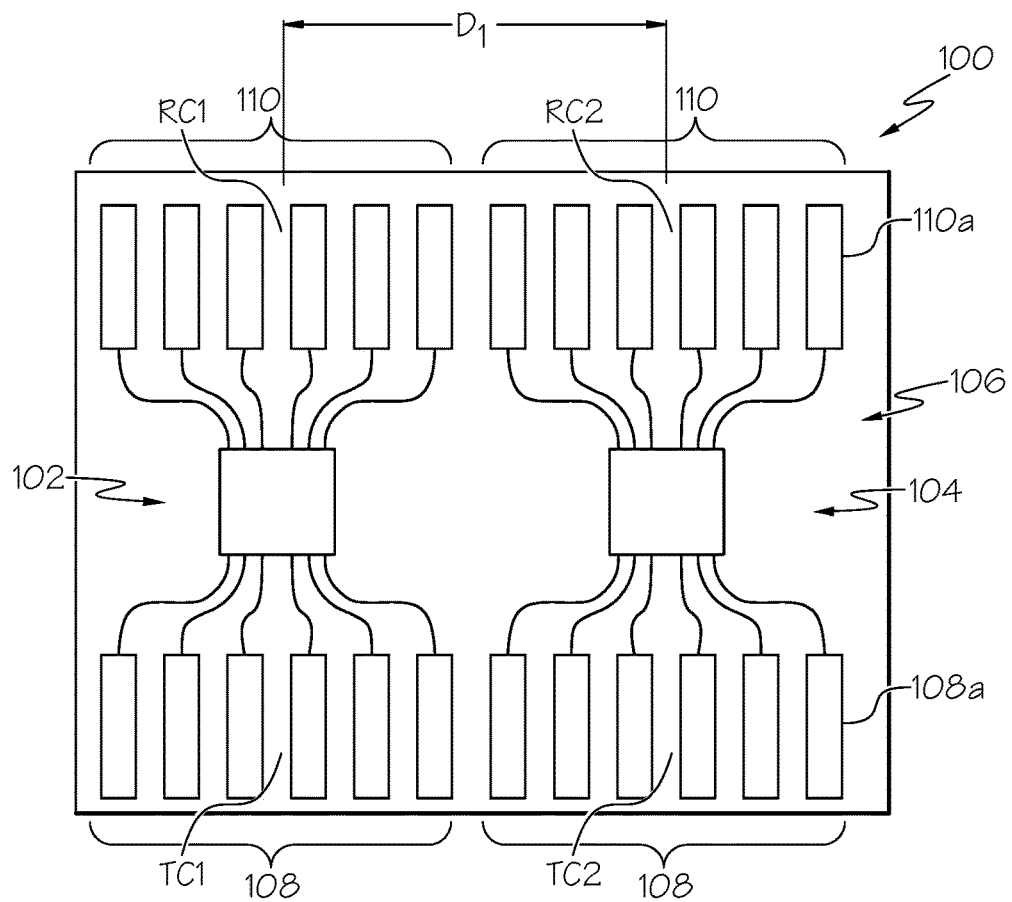
FIG. 1 is a top down view of a prior art radar transceiver assembly.
Figure 2:
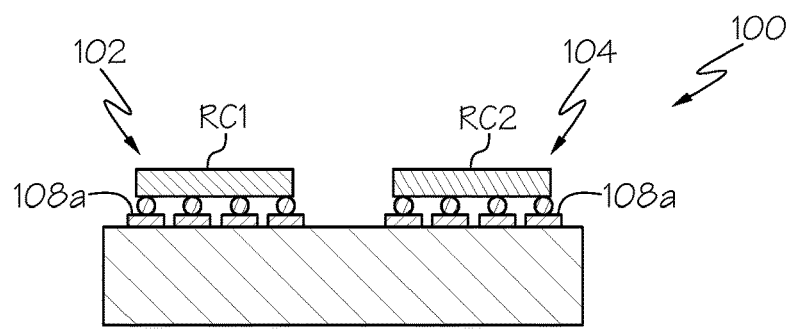
FIG. 2 is a cross-sectional view of the radar transceiver assembly shown in FIG. 1.

With reference again to FIG. 1, it is apparent that the distance "D1" between the center signal RC1 and RC2 of the first and second array of receive antennas in a conventional radar transceiver assembly 100 is greater than the distance "D2" between the center signal RC1 and RC2 of the radar transceiver assembly 10 shown in FIGS. 3a and 3b. Thus, the center receive beam is narrower and the ghost lobes smaller relative to the conventional radar transceiver assembly 100 resulting in clearer images.

FIG. 6 depicts an embodiment of a radar transceiver assembly 10 wherein the first array of transmit antennas 22 are coaxial to the second array of transmit antennas 28. However, the first array of receive antennas 24 are interleaved with the second array of receive antennas 30. Such an embodiment teaches how the performance of the radar transceiver assembly 10 is affected more by the arrangement of the first and second array of receive antennas 24, 30 than the arrangement of the first and second array of transmit antennas 22, 28. FIG. 5 shows how the receive signals are combined into a mixer 48 whereas the transmit signals are not combined.

Figure 7:
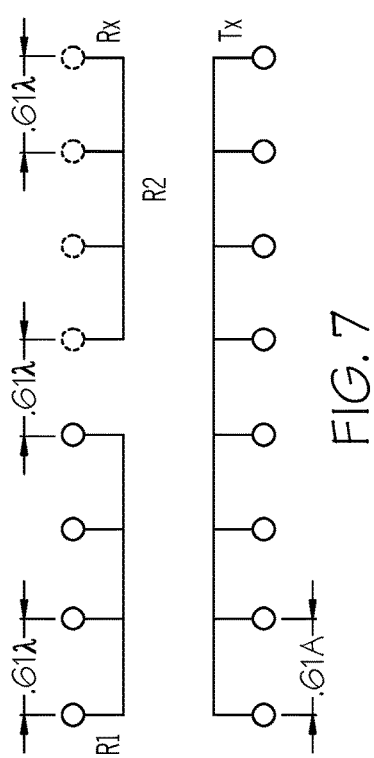
FIG. 7 is a schematic view of an array of receive antennas disposed in a side-by-side arrangement.

FIG. 7 shows an embodiment of a conventional radar transceiver assembly 100 wherein the first array of transmit antennas 22 are coaxial to the second array of transmit antennas 28, and the first array of receive antennas 24 are coaxial with the second array of receive antennas 30. It should be appreciated that the total length of the receive array (4.27 wavelengths) is the same as the length of the interleaved first array of receive antennas and the second array of receive transmitters (4.27 wavelengths). However, the distance between consecutive receive antennas in the array of receive antennas in the conventional radar transceiver assembly 100 is shorter relative to the distance between consecutive first receive antennas 24a and second receive antennas 30a shown in FIG. 6. Specifically, FIG. 7 shows that the distance between each of the receive antennas is 0.61 wavelengths, whereas the distance between consecutive receive antennas in respective first and second array of receive antennas 24, 30 is 1.22 wavelengths. It should be appreciated that the greater the distance between consecutive receive antennas results in better image resolution.

Figure 8:
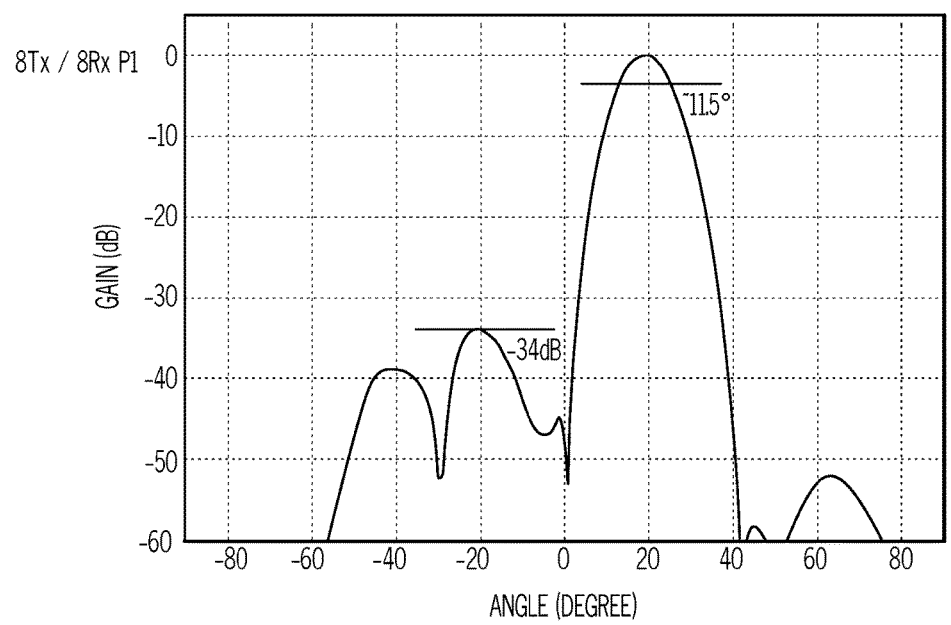
FIG. 8 is a diagram showing a radar signal of the array of interleaved receive antennas shown in FIG. 6.

FIG. 8 is a depiction of a pattern of the receive beam taken by the radar transceiver assembly 10 shown in FIG. 7 operating at 20 degrees. The center beam has a beam width of approximately 13.5 degrees at approximately −4 dB. The ghost lobes have a gain of approximately −31 dB.

Figure 9:
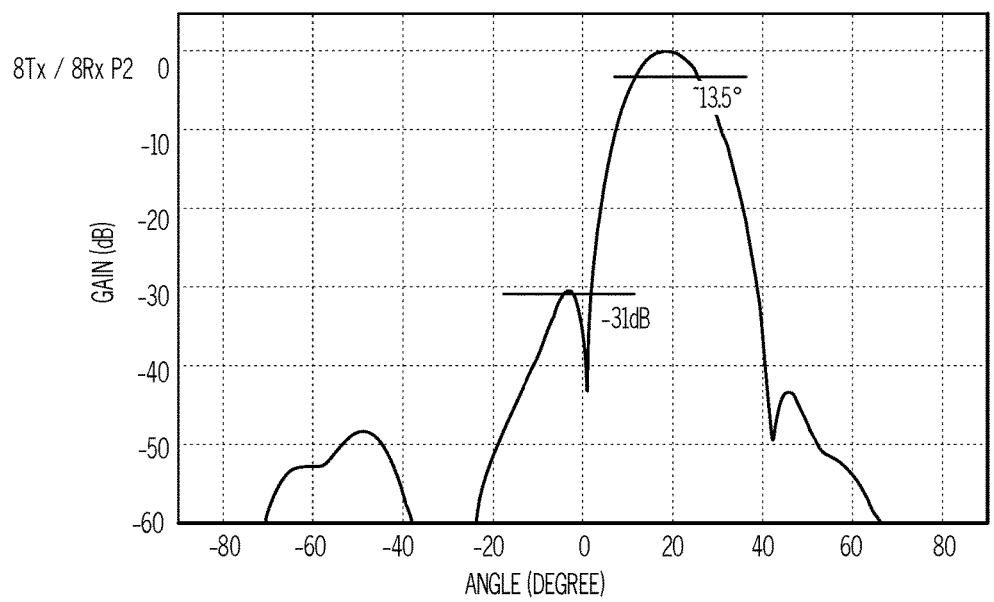
FIG. 9 is a diagram showing a radar signal of the array antennas disposed in a side-by-side arrangement shown in FIG. 7.

FIG. 9 is a depiction of the pattern of the receive beam which when compared with the pattern shown in FIG. 8 operating at 20 degrees. FIG. 9 demonstrates the improvement made by having the center signals "RC1" and "RC2" of closer together relative to the coaxial arrangement of conventional radar transceiver assembly 100. In particular, the receive beam pattern has a narrower beam width (approximately 11.5 degrees) at −4 dB. The ghost lobes are also less prominent relative to the coaxial arrangement of conventional radar transceiver assemblies 100 wherein the first and second array of receive antennas 30 are coaxially arranged. The ghost lobes have a gain of −34 dB relative of the ghost lobes of the coaxially arranged first and second array of receive transceivers coaxially arranged which have a gain of −31 dB.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A radar transceiver assembly comprising:
   a substrate having a first support surface opposite a second support surface;
   a first transceiver chip mounted on the first support surface of the substrate;
   a second transceiver chip mounted on the second support surface of the substrate;
   a first array of transmit antennas and a first array of receive antennas mounted on the first support surface, each of the first array of transmit antennas and the first array of receive antennas is electrically coupled to the first transceiver chip via a respective conductive trace;
   a second array of transmit antennas and a second array of receive antennas mounted on the first support surface, each of the second array of transmit antennas and the second array of receive antennas is conductively coupled to the second transceiver chip, wherein the first array of receive antennas are interleaved with the second array of receive antennas.

2. The radar transceiver assembly of claim 1, wherein the first array of transmit antennas are interleaved with the second array of transmit antennas.

3. The radar transceiver assembly of claim 1, wherein the substrate is a printed circuit board and the conductive trace is printed on the substrate.

4. The radar transceiver assembly of claim 1, further including a coupling structure configured to conductively couple each of the second array of transmit antennas and the second array of receive antennas to the second transceiver chip, wherein the first array of receive antennas are interleaved with the second array of receive antennas.

5. The radar transceiver assembly of claim 4, wherein the coupling structure extends from the first support surface of the second support surface.

6. The radar transceiver assembly of claim 4, wherein the coupling structure is a waveguide disposed between a pair of via holes extending between the first support surface and the second support surface.

7. The radar transceiver assembly of claim 6, wherein the waveguide is made of a dielectric material.

8. The radar transceiver assembly of claim 6, wherein the waveguide is made of a conductive material.

9. The radar transceiver assembly of claim 1, wherein the first array of transmit antennas include a first predetermined number of first transmit antennas and the first array of receive antennas include a second predetermined number of first receive antennas, the first predetermined number of first transmit antennas are equal to the second predetermined number of first receive antennas.

10. The radar transceiver assembly of claim 9, wherein the second array of transmit antennas include a third predetermined number of second transmit antennas and the second array of receive antennas include a fourth predetermined number of second receive antennas, the third predetermined number of second transmit antennas are equal to the fourth predetermined number of second receive antennas.

11. The radar transceiver assembly of claim 9, wherein the predetermined number of transmit antennas in the first array of transmit antennas is an even number and the predetermined number of receive antennas in the first array of transmit antennas is an even number.

12. The radar transceiver assembly of claim 11, wherein the predetermined number of transmit antennas in the second array of transmit antennas is an even number and the predetermined number of receive antennas in the second array of transmit antennas is an even number.

13. The radar transceiver assembly of claim 11, wherein each of the receive antennas in the first array of receive antennas are equally spaced apart from each other.

14. The radar transceiver assembly of claim 13, wherein each of the receive antennas in the second array of receive antennas are centered between a respective pair of receive antennas in the first array of receive antennas.

15. The radar transceiver assembly of claim 13, wherein each of the receive antennas in the first array of receive antennas are spaced 1 to 2 wavelengths from each other.

16. The radar transceiver assembly of claim 13, wherein each of the receive antennas in the first array of receive antennas are spaced apart from each other between 3 mm to 30 mm.

17. The radar transceiver assembly of claim 1, wherein each of the transmit antennas in the first array of transmit antennas are equally spaced apart from each other.

18. The radar transceiver assembly of claim 1, wherein each of the transmit antennas in the second array of transmit antennas are centered between a respective pair of transmit antennas in the first array of transmit antennas.

19. A radar transceiver assembly comprising:
a substrate having a first support surface opposite a second support surface;
a first transceiver chip mounted on the first support surface of the substrate;
a second transceiver chip mounted on the second support surface of the substrate;
a first array of transmit antennas and a first array of receive antennas mounted on the first support surface, each of the first array of transmit antennas and the first array of receive antennas is electrically coupled to the first transceiver chip via a respective conductive trace;
a second array of transmit antennas and a second array of receive antennas mounted on the first support surface, each of the second array of transmit antennas and the second array of receive antennas is conductively coupled to the second transceiver chip, wherein the first array of receive antennas are interleaved with the second array of receive antennas and the first array of transmit antennas are interleaved with the second array of transmit antennas.

20. The radar transceiver assembly of claim 19, further including a coupling structure configured to conductively couple each of the second array of transmit antennas and the second array of receive antennas to the second transceiver chip, wherein the first array of receive antennas are interleaved with the second array of receive antennas.

* * * * *